Aug. 6, 1963  W. S. PARK  3,099,934
STABILIZER FOR THE OPTICAL PROJECTOR CARRIAGE
OF PHOTOGRAMMETRIC PROJECTION INSTRUMENTS
Filed May 22, 1961  2 Sheets-Sheet 1
FIG. 1.
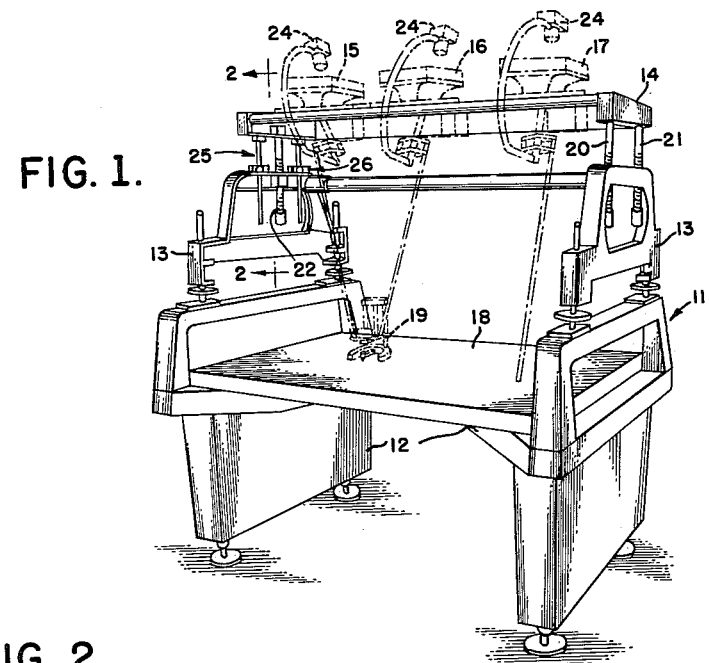
FIG. 2.
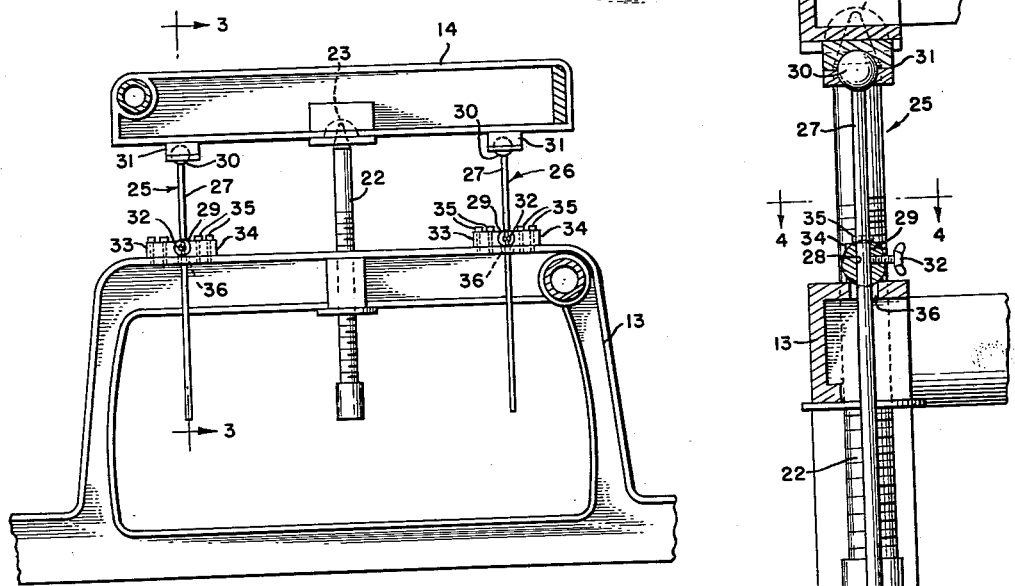
FIG. 3.
FIG. 4.
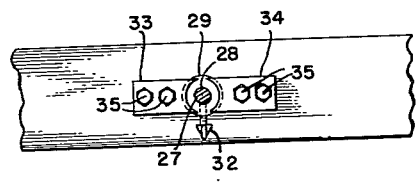
INVENTOR.
W. SIDNEY PARK
BY Albert J. Kramer
ATTORNEY Aug. 6, 1963  W. S. PARK  3,099,934
STABILIZER FOR THE OPTICAL PROJECTOR CARRIAGE
OF PHOTOGRAMMETRIC PROJECTION INSTRUMENTS
Filed May 22, 1961  2 Sheets-Sheet 2

INVENTOR.
W. SIDNEY PARK
BY
Albert J. Kramer
ATTORNEY 3,099,934
United States Patent Office
Patented Aug. 6, 1963

3,099,934
STABILIZER FOR THE OPTICAL PROJECTOR CARRIAGE OF PHOTOGRAMMETRIC PROJECTION INSTRUMENTS
Wallace Sidney Park, Standiford Field, Louisville 13, Ky.
Filed May 22, 1961, Ser. No. 111,521
4 Claims. (Cl. 88—24)

This invention relates to photogrammetric projection instruments and it is more particularly concerned with the stabilization of the optical projector carriage (sometimes also called the projector-track frame) of photogrammetric projection instruments, such as the Kelsh plotter.

An object of the invention is the provision of means in combination with an instrument of the type mentioned for stabilizing the optical projector carriage in different positions of adjustment relative to the main support frame of the instrument.

Another object of the invention is the provision of such means which can be added to existing or standard structure of such an instrument without adversely affecting normal operation of the instrument.

A further object of the invention is the provision of such means which is relatively simple and inexpensive to provide and which is easy to use.

A still further object of the invention is the provision of such stabilizing means in the form of a releasibly clampable linkage between the optical projector carriage and the supporting frame of the instrument which in released position is unconstrained and which in clamped position stabilizes the optical projector carriage against movement relative to the supporting frame.

These and still further objects and advantages of the invention will appear more fully from the following description considered together with the accompanying drawing.

Figure 5:
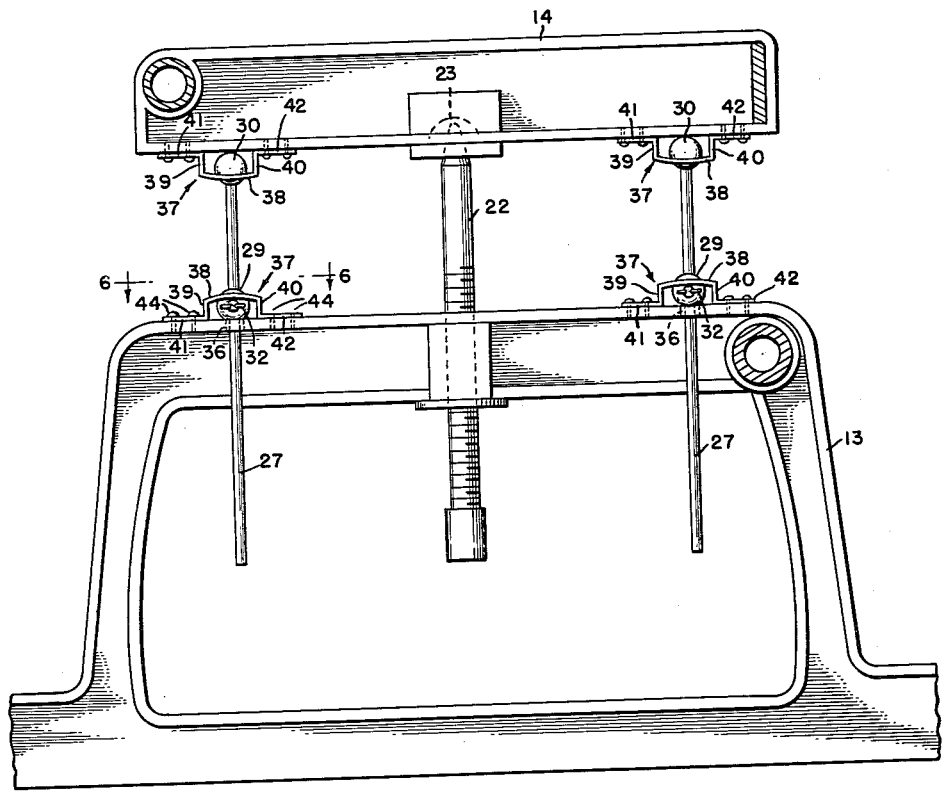
Figure 6:
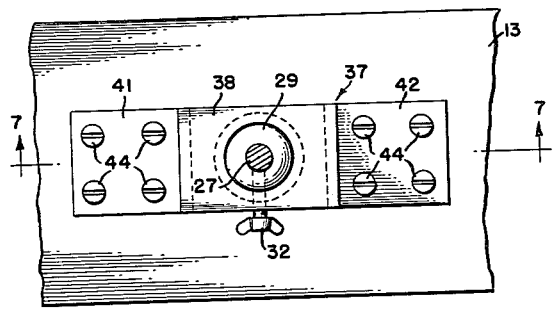
Figure 8:
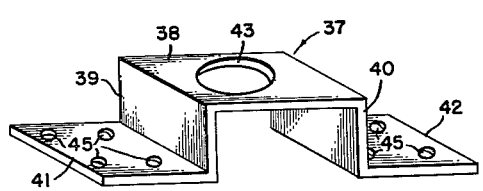
Figure 7:
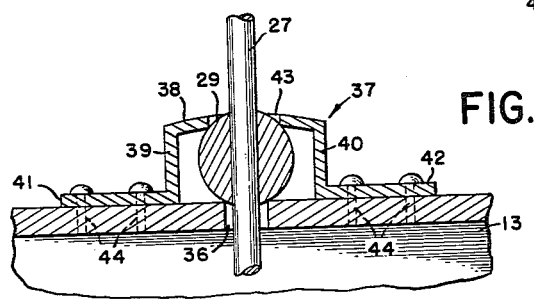

In the drawing:
FIG. 1 is a perspective view, partly in phantom, of a photogrammetric projection instrument showing an embodiment of the invention attached thereto.
FIG. 2 is a section along the line 2—2 of FIG. 1 on a larger scale.
FIG. 3 is a section along the line 3—3 of FIG. 2.
FIG. 4 is a section along the line 4—4 of FIG. 3.
FIG. 5 is a view similar to FIG. 2 showing a modified embodiment of the invention.
FIG. 6 is a section along the line 6—6 of FIG. 5.
FIG. 7 is a section along the line 7—7 of FIG. 6.
FIG. 8 is a perspective view of one of the holding stirrups of the modified embodiment.

Referring with more particularity to the drawing, in which like numerals designate like parts, the embodiments are illustrated in association with a form of photogrammetric projection instrument 11 having a base structure 12, and a frame structure 13 thereon which supports the superposed optical projector carriage 14. The optical projectors, shown in phantom in FIG. 1, are designated by the numerals 15, 16 and 17 respectively, although any plural number of projectors may be carried by the carriage.

The base 12 supports a smooth surface table top 18 over which the plotting table 19 moves to delineate the map elements from a steroscopic image, all of which is conventional and well known in the art.

The optical projector carriage is supported on three vertical adjusting screws, two of these screws 20 and 21 being at one end of the carriage and the third screw 22 being at the opposite end. These screws are each threadedly engaged with the frame 13 and their upper ends are narrow and disposed in recesses at the bottom of the carriage, such as the recess 23 for the upper end of the screw 22.

By limiting the number of these adjusting screws to three, which is conventional, the resulting three point suspension insures a solid support for the carriage on the frame at all times. However, such a three point suspension provides a triangular base, relatively narrow at one end, which sometimes results in a condition known as weaving when the projector lamps 24 are moved about to shift the weight from one side to the other of the triangular base. To overcome this condition and stabilize the carriage, there is provided in accordance with this invention a pair of linkages 25 and 26 between the carriage 14 and the frame 13 on either side of the screw 22.

These linkages each comprise a vertical rod 27 the lower end of which slidably engages an aperture 28 of a ball 29. The upper end of the rod 27 is rigidly attached to a ball 30 which is disposed for universal movement according to the first embodiment in a socket block 31 rigidly secured to or integral with the carriage 14 to form a universal joint.

A clamping or set screw 32 is provided in the ball 29 to releasibly engage the rod 27. The ball 29 is held in universal engagement with the frame by means of block members 33 and 34 on opposite sides secured to the frame by bolts 35. An opening 36 is provided in the carriage below the ball 29 to receive the lower end of the rod 27, the diameter of the opening being sufficiently large to permit the rod to move freely laterally within the limits required. A diameter twice that of the rod has been found satisfactory.

In operation, when it is desired to adjust the position of the carriage 14 on the frame 13, the set screws 32 are released from engagement with the rods 27, whereby the linkages 25 become unconstrained and thereby interpose no restrictions on any movement of the carriage relative to the frame. After adjustment of the position of the carriage has been completed by means of the adjusting screws 20, 21 and 22, it is stabilized by simply tightening the set screws 32 whereby the base of support is changed from the triangle defined by the screws to a rectangle or trapezoid defined by screws 20 and 21 at one end and the linkages 25 and 26 at the opposite end.

It is to be understood that the invention would be equally effective if the linkages were turned upside-down so that the ball 29 would be mounted on the carriage 14 instead of the frame and the socket block 31 secured to the frame instead of the carriage.

Also, since the linkages are capable of resisting stresses in tension as well as compression, it is within the scope of this invention to use only one of the linkage units 25.

It is also to be understood that additional clamping screws may be provided between the balls 29 and 30 or either of them and their respective holding members.

In accordance with the modified embodiment of FIGS.

5 to 8, there are substituted for the rigid blocks 31 and the block members 33—34, stirrups 37 formed of strips of resilient material, such as spring steel. The strips are each bent to provide a horizontal middle section 38, a pair of vertical leg sections 39, 40 at the ends of the middle section, and outward flanges or foot sections 41, 42 at the outer ends, respectively, of the leg sections. The middle section 38 is provided with an aperture 43 to receive the end of the corresponding ball it is to retain. The leg sections 39, 40 are somewhat shorter than the height of that portion of the ball between the point of contact with the section 38 and the frame or carriage, as the case may be, whereby when the stirrups are secured in place by means of screws or bolts 44, through apertures 45 in the foot sections the balls are placed under force of the resulting resilient tension of the stirrups.

Having thus described this invention, I claim:

1. In a photogrammetric projection instrument having a frame structure, an optical projector carriage superposed on the frame structure, a group of three vertical adjusting screws supporting the carriage on the frame, two of said adjusting screws being disposed at one end of the carriage and the third being disposed at the opposite end of the carriage, interconnected members forming an unconstrained linkage, one end of the linkage being connected to the carriage and the other end connected to the frame, said linkage having a ball and socket at either end, a rod connecting the balls, one of the balls being slidably engaged with the rod, and means for releasibly securing the rod to the said ball with which it is slidably engaged.

2. In a photogrammetric projection instrument having a frame structure, an optical projector carriage superposed on the frame structure, a group of three vertical adjusting screws supporting the carriage on the frame, two of said adjusting screws being disposed at one end of the carriage and the third being disposed at the opposite end of the carriage, a normally unconstrained linkage comprising a vertical rod between the frame and the carriage, a pivot joint connecting the rod to the carriage, a second joint connecting the rod to the frame, said second joint comprising a pivoted member slidably engaging the rod, and means for releasibly locking the rod to the pivoted member of the second joint, said pivoted joints each comprising a ball member and a strip of resilient material adapted to slidably engage the ball member.

3. The subject matter as defined by claim 2 and means for holding the strip of material under resilient tension against the ball member.

4. The subject matter as defined by claim 2 in which the strip of material is bent to provide a horizontal middle section, vertical leg sections at the ends of the middle section and horizontal foot sections at the ends of the leg sections, said middle section having an aperture therein for the reception of a portion of the ball member.

References Cited in the file of this patent

UNITED STATES PATENTS

| | | |
|---|---|---|
| 2,510,059 | Black | June 6, 1950 |
| 2,744,442 | Mosher et al. | May 8, 1956 |